Nov. 24, 1925.
E. P. FARUM
1,562,694
COMBINED BUMPER AND LUGGAGE CARRIER
Filed Feb. 13, 1924
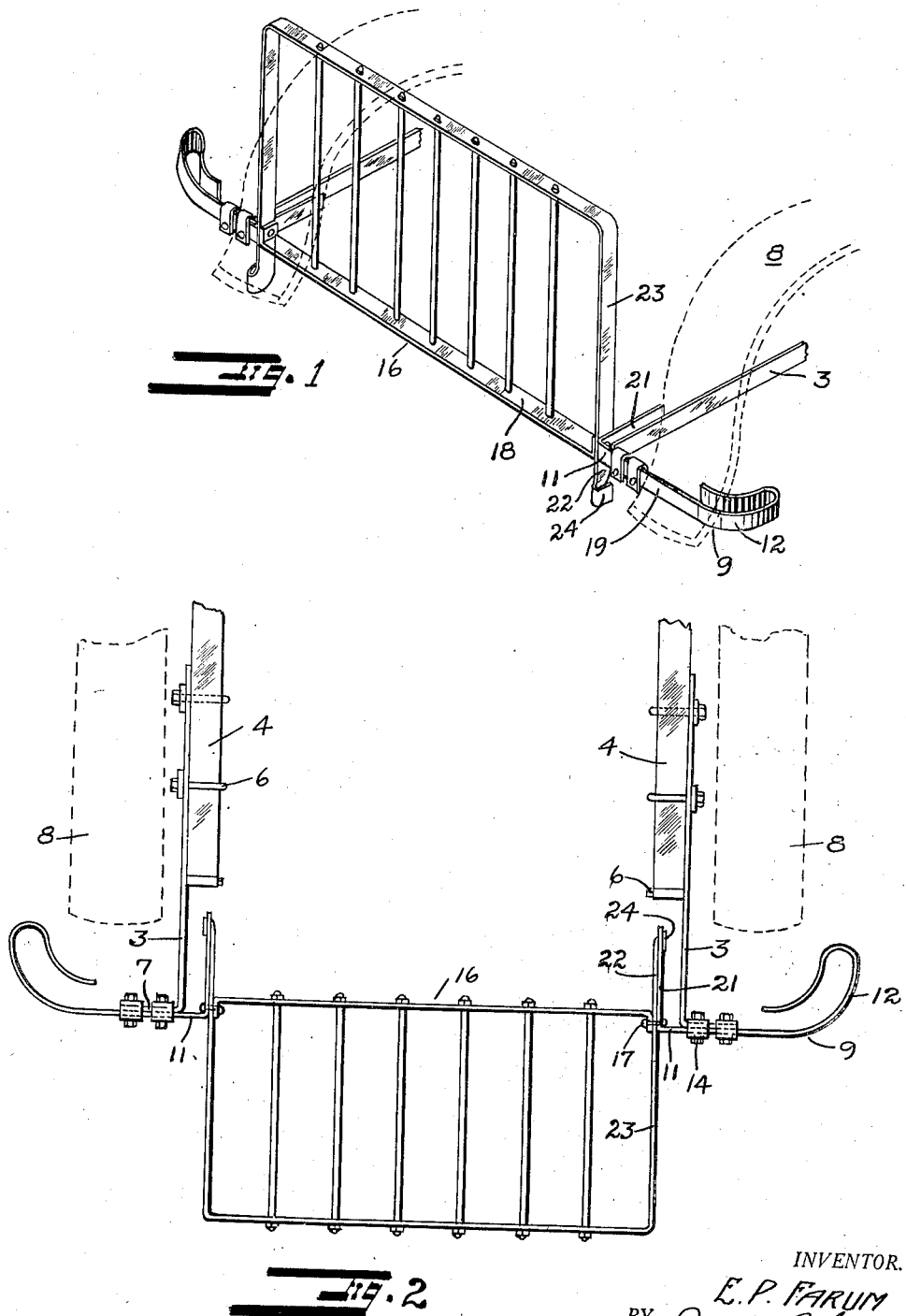
INVENTOR.
E. P. FARUM
BY Joseph B. Gardner
ATTORNEY.

Patented Nov. 24, 1925.

1,562,694

UNITED STATES PATENT OFFICE.

ELECIE P. FARUM, OF OAKLAND, CALIFORNIA, ASSIGNOR TO OAKLAND MACHINERY COMPANY, OF OAKLAND, CALIFORNIA, A CORPORATION OF CALIFORNIA.

COMBINED BUMPER AND LUGGAGE CARRIER.

Application filed February 13, 1924. Serial No. 692,519.

*To all whom it may concern:*

Be it known that I, ELECIE P. FARUM, a citizen of the United States, and a resident of Oakland, county of Alameda, and State of California, have invented a certain new and useful Combined Bumper and Luggage Carrier, of which the following is a specification.

My invention relates to a device attachable to the rear end of an automobile for the purpose of carrying luggage and protecting the automobile against rear collisions. More particularly the invention relates to devices of this type, in which the luggage carrier member is foldable and forms a large part of the bumper.

An object of the invention is to provide a device of the character described, that is of the type having a foldable carrier forming part of the bumper, which may be made in a standard size and form and attached to practically all makes and sizes of automobiles without the use of special parts.

Another object of the invention is to provide a combined bumper and carrier with the foregoing advantage, which is very simple in construction and extremely neat in appearance.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a perspective view of the device as it appears when positioned on the rear of an automobile and with the carrier folded.

Figure 2 is a plan view of the device with the carrier extended and showing the device attached to the frame members of the automobile.

Combined bumpers and luggage carriers, of the type to which the present invention particularly relates, have heretofore been constructed in a manner which, owing to the various specifications of the different automobiles, required either the use of special parts for fitting the device to the different automobiles, or the use of a large number of different sized carriers. The use of special parts and different sized carriers obviously involves the necessity of carrying large stocks and results in considerable expense for installation. In accordance, however, with my invention, the carrier and parts are all of one standard size, the necessary adjustment for the different makes of automobiles being readily afforded in assembling and installing the device.

As previously stated the device of my invention is particularly adapted for attachment to the rear end of an automobile, and in the present embodiment, comprises a pair of brackets 3 which are arranged to be secured to the frame members of the automobile. As here shown the brackets are secured adjacent their forwards ends to the longitudinal frame members 4 by means of J-bolts 6. The rear ends of the brackets are preferably formed with short angular extensions 7 which extend outward from the adjacent side of the automobile.

Positioned directly in the rear of the hind fenders 8 of the automobile are bumper members 9 whose inner and outer ends 11 and 12 are arranged to lie more or less in line with the corresponding edges of the fenders with which they are associated. Each bumper member as here shown comprises a horizontally disposed bar 19 which is secured intermediate the ends 11 and 12 to the extension 7 of the brackets by means of one or more suitable clamps 14. It is to be noted that by thus securing the bumpers to the brackets, the former may be readily positioned to lie closer or farther apart regardless of the distance between the brackets or the longitudinal frame members 4.

Arranged to be interposed between the bumpers 9 is a luggage carrier rack or frame 16 preferably of rectangular form and adapted to be pivotally connected adjacent the ends of one of its longer sides to the inner ends 11 of the bumpers. The rack is made of a standard size, and owing to the adjustable positioning of the bumpers, the latter may be moved toward or from each other to accommodate the rack. The rack is secured to the bumpers by means of pivot bolts 17, and is adapted to be held in the vertical or folded position shown in Figure 1, or swung from said position to the horizontal or extended position shown in Figure 2. It is to be noted that the lower side member 18 of the rack is aligned with the straight portion 19 of the bars lying between the ends 11 and 12, thus when the rack is in vertical position, the side member 18 and portions 19 give the effect and appearance of a continuous bumper bar extending completely across the rear of the vehicle.

Cooperating means are provided on the bumper members and rack for effectively holding the rack from swinging downward further than horizontal position. Extending forwardly from the inner edge of each of the bumper members is an extension 21 which is arranged to be engaged by an extension 22 of the side members 23 of the rack when the carrier is in horizontal position. The extension 22 is provided with an offset end 24 which is arranged to engage the extension 22 at a point considerably in front of the carrier pivot, thus insuring rigid connection between the rack and bumper members when a heavy load is carried on the rack.

I claim:

1. In a combined bumper and luggage carrier for automobiles, brackets adapted to be secured to the automobile, bumpers adjustably secured to said brackets and positioned at the rear of the rear fenders of the automobile, and a carrier rack pivoted to said bumpers and interposed therebetween.

2. In a combined bumper and luggage carrier for automobiles, a bracket adapted to be secured to a member of the automobile, a bumper adjustably secured to said bracket and positioned at the rear of a rear fender of the automobile, the inner and outer ends of said bumper being disposed adjacent the corresponding edges of said fender, and a carrier rack pivoted to said bumper adjacent said inner end.

3. In a combined bumper and luggage carrier for automobiles, a pair of brackets adapted to be secured to the automobile, bumpers adjustably secured to said brackets positioned respectively at the rear of the rear fenders of the automobile and having their inner and outer ends substantially aligned with the corresponding edges of the associated fender, and a carrier rack interposed between said bumpers and pivotally carried thereby.

4. In a combined bumper and luggage carrier for automobiles, a bracket adapted to be secured to a member of the automobile, a bumper positioned back of one of the rear fenders of the automobile, secured to said bracket, and adjustable transversely of the automobile, a carrier rack pivoted to said bumper, and cooperating means on said bumper and bracket spaced from the pivot point for limiting the movement of said carrier when swung downwardly from a substantially vertical position.

5. In a combined bumper and luggage carrier for automobiles, a bracket adapted to be secured to a frame member of an automobile, a bumper including a bar positioned at the rear of a hind fender of the automobile and secured to said bracket for adjustment transversely thereof, an angularly disposed member cooperative with said bar adjacent an end thereof, a carrier rack pivoted to said bar adjacent said end, and a member associated with said rack adapted to cooperate with said bar member to limit the movement of said rack when swung downwardly.

6. In a combined bumper and luggage carrier for automobiles, a pair of brackets adapted to be fixed to the frame members respectively of an automobile and arranged to extend rearwardly therefrom, bumper members spaced transversely of each other relative to the automobile and fixed to said brackets respectively in a manner permitting adjustment toward and from each other, a luggage rack interposed between said members and pivotally connected to adjacent portions thereof and forming with said members a substantially continuous bumper, and means extending from said members and carrier arranged to cooperate with each other to limit the movement of said carrier when swung downwardly.

7. In a combined bumper and luggage carrier for automobiles, bumper members spaced transversely of each other relative to the automobile and positioned at the rear thereof, means for securing said bumpers to the automobile permitting adjustment of the bumpers toward and from each other, and a luggage rack carried between said bumpers.

8. In a combined bumper and luggage carrier for automobiles, bumper members spaced transversely of each other relative to the automobile and positioned thereon at the rear for adjustment toward and from each other, and a carrier pivoted to said bumpers and arranged to cooperate therewith to define a thrust member across the rear of the automobile.

9. In a combined bumper and luggage carrier for automobiles, brackets secured to and extending rearwardly from the frame members respectively of an automobile, bumper members comprising horizontally extending and spaced bars positioned directly in the rear of the hind fenders respectively of the automobile and secured to said brackets for adjustment toward and from each other, the inner and outer ends of each bumper lying adjacent the corresponding edges of the associated fender, a forward extension at the inner end of each bumper, a substantially rectangular luggage carrier frame interposed between said bumpers and pivotally connected thereto adjacent opposite ends of one of the longer sides of the frame, and means extending from said frame adapted to engage said bumper extensions and limit the movement of said frame when the latter is swung downwardly from a substantially vertical position.

In testimony whereof, I have hereunto set my hand at Oakland, California, this 2nd day of February, 1924.

ELECIE P. FARUM.